US008244607B1

(12) United States Patent
Quinn et al.

(10) Patent No.: US 8,244,607 B1
(45) Date of Patent: Aug. 14, 2012

(54) SYSTEM AND METHOD FOR CREATING AND IMPLEMENTING COMMUNITY DEFINED PRESENTATION STRUCTURES

(75) Inventors: Christopher N. Quinn, Del Mar, CA (US); Anthony L. Creed, San Diego, CA (US); Kenichi Mori, Carlsbad, CA (US); Justin C. Marr, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 230 days.

(21) Appl. No.: 12/698,939

(22) Filed: Feb. 2, 2010

Related U.S. Application Data

(63) Continuation of application No. 11/618,184, filed on Dec. 29, 2006, now Pat. No. 7,680,758.

(51) Int. Cl.
*G06F 17/22* (2006.01)
*G06F 9/445* (2006.01)

(52) U.S. Cl. .......................................... 705/31; 717/165

(58) Field of Classification Search ...................... 705/31
See application file for complete search history.

(56) References Cited

U.S. PATENT DOCUMENTS

| 5,819,249 | A | * | 10/1998 | Dohanich et al. | 706/46 |
| 6,564,375 | B1 | * | 5/2003 | Jiang | 717/165 |
| 6,791,587 | B1 | | 9/2004 | Bamford et al. | |
| 7,089,500 | B2 | | 8/2006 | Li | |
| 7,383,535 | B1 | * | 6/2008 | Kshetrapal et al. | 717/122 |
| 7,539,635 | B1 | * | 5/2009 | Peak et al. | 705/31 |
| 7,603,301 | B1 | * | 10/2009 | Regan | 705/31 |
| 2002/0073119 | A1 | | 6/2002 | Richard | |
| 2002/0111888 | A1 | * | 8/2002 | Stanley et al. | 705/31 |
| 2007/0016434 | A1 | * | 1/2007 | Oppenheimer et al. | 705/1 |
| 2007/0088601 | A1 | * | 4/2007 | Money et al. | 705/10 |
| 2008/0189197 | A1 | * | 8/2008 | Allanson et al. | 705/31 |

OTHER PUBLICATIONS

"How to Get the Most Out of Flickr", Copyright 2005 Yahoo!, Inc., 3 pages.

* cited by examiner

*Primary Examiner* — Elaine Gort
*Assistant Examiner* — Ashford S Hayles
(74) *Attorney, Agent, or Firm* — Osha Liang LLP

(57) ABSTRACT

A presentation configuration system may receive metadata from multiple users utilizing tax preparation applications. The metadata may be tags or labels of interview segments of the tax preparation applications. The presentation configuration system may create community defined presentation structures from the metadata such that the community defined presentation structure includes an organization of interview segments within a tax preparation application. The community defined presentation structure may indicate how interview segments of a tax preparation application should be presented to a user. Furthermore, a tax preparation application may provide a user (e.g., a taxpayer) with multiple options corresponding to community defined presentation structures. The tax preparation application may receive a selection of one of the options from the user. Thus, the tax preparation application may present the tax preparation interview segments of the tax preparation application to the user according to the community defined presentation structure indicated by the option selected.

15 Claims, 12 Drawing Sheets

SYSTEM AND METHOD FOR CREATING AND IMPLEMENTING COMMUNITY DEFINED PRESENTATION STRUCTURES

CROSS-REFERENCE TO RELATED APPLICATIONS

This patent application is a continuation of U.S. patent application Ser. No. 11/618,184, filed on Dec. 26, 2006, and assigned to assignee of the present application. Accordingly, this patent application claims benefit of U.S. patent application Ser. No. 11/618,184 under 35 U.S.C. §120. U.S. patent application Ser. No. 11/618,184 is hereby incorporated in its entirety.

BACKGROUND

Utilizing a preparation application has become a popular method of preparing a return, such as a tax return, for filing with an authority. Typically, preparation applications will present a series of questions or prompts to a user in order to obtain the necessary information to complete a return. Multiple interview segments (e.g., one or more screens of the preparation application) may include questions or prompts. Thus, to complete a return, the preparation application may present the multiple interview segments to the user. Typically, the configuration or organization in which the preparation application is configured to present the interview screens by default may be known as the default presentation structure. While viewing the interview segments, the user may enter the necessary information (e.g., income, deductions, credits) for the completion of a return.

Preparation applications may present the various interview segments according to a static hierarchical configuration such as one or more tree structures of various topics. For example, the preparation application may navigate through a tree structure beginning with a root node. The root node may be a parent that has child nodes (e.g., income, deductions, and credits). Each child of the root node may also be a parent node. For example, "income" may be a child topic of the root "taxes" while also being a parent topic to "wages," and "interest." Typically, the taxonomy of the hierarchical configuration in which the preparation application adheres to may not be particularly meaningful to a user lacking knowledge of the specific taxonomy.

Furthermore, if the user would like to search for a particular topic (e.g., donating my car), the search function of the preparation application may be limited to searching within the data of the particular hierarchical configuration. Thus, to produce the most meaningful search results, the user may need to have a clear understanding of the particular accounting terms and taxonomy used throughout the hierarchical tree structure. For example, instead of searching for "donating my car," the user may need to search using other terms such as "charitable contribution of an automobile."

SUMMARY

A user (e.g., a taxpayer) may prepare a return by utilizing a preparation application, such as a tax preparation application. The preparation application may present multiple interview segments (e.g., displays or screens of the preparation application) to the user in order to gather the necessary information from the user, such as for preparing a tax return. The interview segments may contain various questions or prompts that the user may respond to with answers or other necessary information.

The manner in which the interview segments are presented to the user may correspond to a default presentation structure. In other words, the order or organization in which each interview segment (and the corresponding questions or prompts) is presented to the user may be defined by the default presentation structure. The default presentation structure may organize the interview segments into default categories (e.g., taxes, income, deductions) as well as providing default labels (e.g., income tax, wages, interest, or another tax related label) for each interview segment.

The preparation application may enable the user to change the presentation structure to include custom (e.g., user defined) tags, labels, or configuration metadata submitted by the user for each interview segment. For example, the user may decide to tag all interview segments pertaining to personal income with a label such as "my earnings" or another label that the user finds appropriate. Additionally, the preparation application may enable the user to reorganize the manner in which interview segments are presented to the user. In some embodiments, the preparation application may enable the user to submit the presentation configuration metadata (e.g., tags, labels, or other metadata for interview segments) to a community presentation configuration system.

A presentation configuration system may receive metadata from multiple users utilizing preparation applications. The metadata may be tags, labels, or other configuration metadata of various interview segments of the preparation applications. The presentation configuration system may create a community defined presentation structure(s) from the metadata such that the community defined presentation structure includes an organization of interview segments within a tax preparation application. The organization of interview segments may define the manner in which interview segments are presented to a user as well as the individual labeling of each interview segment. In other words, the community defined presentation structure may indicate how interview segments of a preparation application may be presented to a user.

The presentation configuration system may create the community defined presentation structures with the metadata submitted by multiple users. For example, the presentation configuration system may determine the most popular (e.g., most frequently submitted) metadata (e.g., tags or labels) and organize interview segments according to the topics indicated by the metadata. The presentation configuration system may provide the community defined presentation structures for use by preparation applications.

Furthermore, a preparation application may provide a user (e.g., a taxpayer) with multiple options corresponding to community defined presentation structures. For example, if a user prefers to use a different presentation structure (e.g., a more user-friendly or easily understood presentation structure), the user may select one of the community defined presentation structures. The preparation application may receive a selection of one of the community defined presentation structures from the user. The preparation application may present the preparation interview segments of the preparation application to the user according to the community defined presentation structure indicated by the option selected. The community defined presentation structures may make the preparation more user-friendly or easily understood for the user (e.g., if the user is not familiar with accounting or tax terms).

Figure 1:
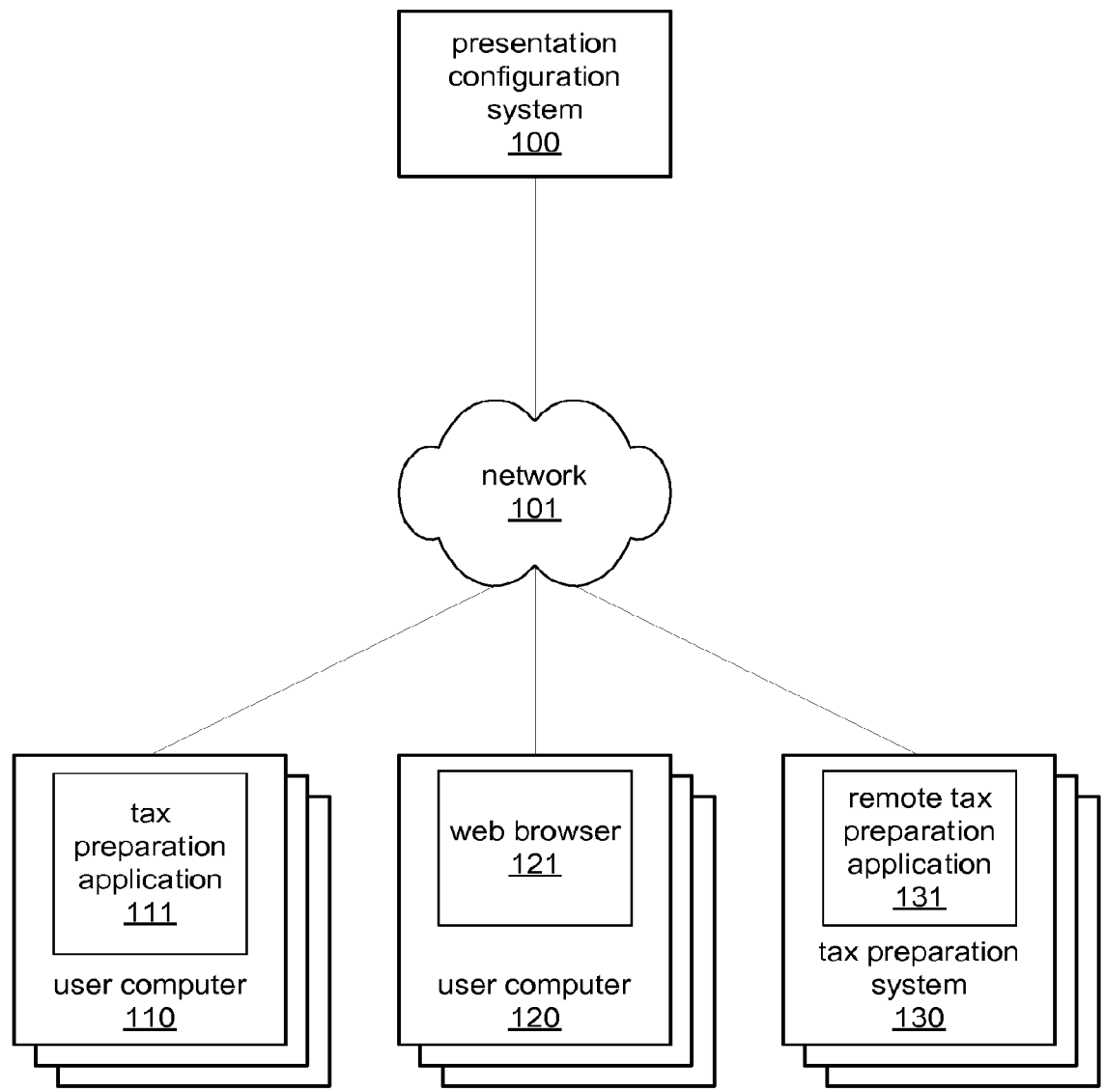
FIG. 1 illustrates a system including a presentation configuration system and tax preparation applications according to one embodiment.

While the presentation configuration system and various tax preparation applications are described herein by way of example for several embodiments and illustrative drawings, those skilled in the art will recognize that the presentation configuration system and various tax preparation applications are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of the presentation configuration system and various tax preparation applications as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for creating and implementing community defined presentation structures in preparation applications are described. The preparation applications may be configured to prepare returns (e.g., tax returns, compliance statements, or reports) for various agencies or authorities including taxing authorities, government oversight authorities, and compliance authorities. For example, a preparation application may be utilized to prepare compliance statement for an authority such as the Security and Exchange Commission. While the embodiments described herein may pertain to taxing authorities and tax returns, the descriptions are not intended to limit the embodiments to a particular authority or a particular type of return.

A tax preparation application may include a default presentation structure that defines the manner in which tax preparation interview segments (hereinafter referred to as interview segments) are presented to a user (e.g., a taxpayer). In some cases, the default presentation structure may utilize a taxonomy that is difficult for the user to understand. Thus, the user may desire a more user-friendly or easily understood presentation structure. The tax preparation application may enable the user to utilize a different presentation structure that includes custom (e.g., user defined) tags, labels, or configuration metadata submitted by the user for each interview segment. Additionally, the tax preparation application may enable the user to reorganize the manner in which interview segments are presented to the user. In some embodiments, the tax preparation application may enable the user to submit the presentation configuration metadata (e.g., tags, labels, or other metadata for interview segments) to a presentation configuration system.

A tax preparation configuration system may receive metadata, such as user-defined tags, labels, or other configuration metadata corresponding to various tax preparation application interview segments. In general, an interview segment may be any portion of the tax preparation application that is presented to the user (e.g., an interview screen prompting a user for tax information). The tax preparation application may provide the tag to the presentation configuration system as metadata. The tax preparation configuration system may create community defined presentation structures for tax preparation applications from the metadata. In general, community defined presentation structures may be any presentation structure created from interview segment metadata supplied by a user (e.g., tags or labels). The presentation structures may be created from the metadata of multiple users. In some cases, the presentations structures may be specifically created to make the interview segments of the tax preparation application more user-friendly or easily understood for the user.

A tax preparation application may access a community defined presentation structure from the presentation configuration system. The tax presentation application may present the interview segments to a user of the tax preparation application according to the presentation structure. Thus, the tax preparation may provide alternatives to the default presentation structure to the user. For example, in some cases the user may not understand or prefer the taxonomy of the default presentation structure. Thus, the user may choose a community defined presentation structure that is more user-friendly or easily understood. For example, the tax preparation application may present the interview segments to a user according to a "novice" presentation structure that is easily understood by a first time tax preparation application user, as opposed to an "advanced" or "expert" presentation structure that might be best understood by a tax professional or certified public accountant (CPA).

FIG. 1 illustrates a system including a presentation configuration system and system running tax preparation applications according to one embodiment. Presentation configuration system 100 may communicate through network 101 to any entity of FIG. 1 such as the various user computers or tax preparation systems. Network 101 may be a Wide Area Network (WAN) such as the internet or a private WAN. Network 101 may include Local Area Networks (LAN) and wireless networks such as Wireless Local Area Networks (WLAN). In some embodiments, network 101 may be a combination of networks such as the networks described above.

Collection of Metadata

A user (e.g., taxpayer) may use a user computer (e.g., any of the various user computers of FIG. 1) to prepare a tax return. For example, a user may utilize user computer 110 to access tax preparation application 111 to create a tax return. Tax preparation application 111 may present multiple interview segments (e.g., interview screens or displays prompting the user for tax information) to a user. The interview segments may be presented to the user according to a presentation structure (e.g., a default presentation structure). The interview segments may include tax related questions or prompts pertaining to information necessary for the completion of a tax return. For example, tax preparation application 111 may ask the user to provide information pertaining to income, tax deductions, or tax credits. In further example, tax preparation application 111 may request information from a user that would typically be included on a tax return form (e.g., Internal Revenue Service Form 1040, 1040A, 1040EZ or any other tax return form). Once the user provides the necessary tax related information through the completion of the necessary interview segments, tax preparation application 111 may create a tax return for the user.

Alternatively, a user may use a remote tax preparation application, such as remote tax preparation application 131, to prepare a tax return. A user may utilize user computer 120 equipped with web browser 121 to access remote tax preparation application 131 on tax preparation system 130. Web browser 121 may represent any of various web-browsing applications, such as Microsoft Internet Explorer™, Netscape Navigator™, Mozilla Firefox™, or any application that is capable of accessing and displaying documents or web pages, such as according to the Hypertext Transport Protocol (HTTP). Additionally, web browser 121 may utilize additional applications that are necessary to access remote tax preparation application 131 such as a web browser plug-in or Java applet or any other application that adds functionality to web browser 121. Thus, the user may use web browser 121 to access remote tax preparation application 131 of tax preparation system 130 over network 101. Remote tax preparation application 131 may be any application capable of preparing or creating an electronic tax return by receiving tax related information from a user over a network, such as network 101. For example, in one embodiment, web browser 121 may access and display to the user a user interface of remote tax preparation application 131. The user interface may enable the user to submit tax related information to remote tax preparation application 131. Web browser 121 may present to the user a series of interview segments (e.g., questions or interview screens) of a presentation structure that prompt the user for tax related information such as income, tax deductions, or tax credits. For example, web browser 121 may request information from a user that would typically be included on a tax form (e.g., Internal Revenue Service Form 1040, 1040A, 1040EZ or any other tax return form). The tax related information collected by web browser 121 may be transmitted to remote tax preparation application 131. Once the remote tax preparation application receives the necessary tax information, it may create a tax return for the user.

In some embodiments, presentation configuration system 100 may communicate with multiple users. For example, multiple users may each use separate tax preparation applications on separate user computers (such as the multiple user computers illustrated in FIG. 1) to communicate with presentation configuration system 100. Additionally, each of the users may communicate to presentation configuration system 100 via respective tax preparation applications and user computers.

In one embodiment, the tax preparation applications (e.g., tax preparation application 111 or remote tax preparation application 131) may enable a user to alter the default presentation structure with personalized tags, labels or other configuration metadata for the various interview segments of the tax preparation application. For example, if a user does not prefer a label of an interview segment, the user may change the label through an interface of the interview segment. For instance, a user may change a default label of an interview screen (e.g., "income") pertaining to income to a different label such as "money" or "earnings" or any other label that the user prefers. In other words, through the use of interview segment metadata (e.g., user-defined tags or labels), the user may create a presentation structure that is more user friendly or easily understood than the default presentation structure. Additionally, in some embodiments, the tax preparation applications (e.g., preparation applications 111 or 131) may submit the interview segment metadata to presentation configuration system 100. The mechanism for submitting metadata is described below.

The tax preparation application's (e.g., tax preparation application 111 or remote tax preparation 131) interview segments may include a mechanism for submitting metadata associated with the interview segment. In other words, the mechanism may enable a user preparing a tax return with a tax preparation application (such as the tax preparation applications of FIG. 1) to submit metadata associated with an interview segment of the tax preparation application (such as the user-defined meta data described above). For example, an interview segment of the tax preparation application may be an interview screen including a prompt for information pertaining to the user's annual wages. The user may submit metadata (e.g., tags or labels) that the user considers appropriate for the interview segment. For the example of an interview segment pertaining to annual wages, the user may replace a default "income" label by submitting tags such as "earnings," "job," "work," or "money" among any other tag the user considers appropriate. In general, an interview segment may include any mechanism that enables the user to submit metadata. For example, the interview segment may include any combination of text entry boxes, dialog boxes, buttons, or controls. One example of a user display including an interview segment and mechanism for submitting metadata is described below in regard to FIG. 10.

In one embodiment, the tax preparation applications of FIG. 1 may be configured to store the metadata such that the metadata retains an association with the interview segment in which it was submitted. For example, each interview segment may have a unique identifier that uniquely identifies the interview segment among the other interview segments within the same presentation structure. Thus, the tax preparation application may include the identifier in the metadata before transmitting the metadata to presentation configuration system 100. This may facilitate the organization of metadata by the presentation configuration system. For example, the identifier may include information that identifies the tax preparation application that submitted the metadata, the user that submitted the metadata (e.g. by username or Internet Protocol (IP) address), or a defining characteristic of the platform in which the metadata was created. The presentation configuration system 100 may collect the user-submitted metadata from multiple tax preparation applications, such as tax preparation application 111 or remote tax preparation application 131, over network 101. Subsequently, the presentation configuration system may store the metadata internally (e.g., in a memory of the presentation configuration system).

In some embodiments, the tax preparation application, such as tax preparation application 111 or remote tax preparation application 131, may automatically transmit user-submitted metadata to the presentation configuration system once the metadata is received from a user. For example, as described above, a user may utilize a tax preparation application to view an interview segment and submit a tag for the interview segment through a text entry box. In response to receiving the tag from the user, the tax preparation application may transmit the tag as metadata associated with the respective interview segment to the presentation configuration system. In other embodiments, after receiving metadata for a particular interview segment, the tax preparation application may store (e.g., in a memory of user computer 110) the metadata with different metadata associated with other interview segments. In other words, the tax preparation application may store groups of metadata associated by a common characteristic such as a user characteristic (e.g., user location) or a particular interview segment (e.g., a default presentation structure interview segment).

Creation of Presentation Structures

Typically, the tax preparation applications, such as tax preparation application 111 and tax preparation application 131, may include a default presentation structure. The default presentation structure may define how a tax preparation application should present interview segments to a user. For example, the default presentation structure may indicate the order or sequence in which the interview segments should be presented to a user. In one embodiment, the default presentation structure may be a hierarchical tree structure in which the interview segments are categorized by tax topic. For example, the tax preparation application, such as the tax preparation applications of FIG. 1, may present the interview segments to the user according to various tax topics. For instance, the presentation structure may include multiple tax topics such as "wages" and "taxable interest". Thus, in this example, the tax preparation application may present to a user the interview segments associated with the tax topic "wages" followed by the interview segments associated with the tax topic "taxable interest." Each tax topic may include one or more interview segments. In general, a presentation structure may be any structure or configuration that indicates how interview segments should be presented to a user in a tax preparation application. In some embodiments, the default presentation structure may be a static hierarchical structure such as a tree structure. One example of a graphical representation of a default presentation structure is described below in regard to FIG. 7.

Presentation configuration system 100 may create community defined presentation structures from the collected interview segment metadata described above. In other words, a community defined presentation structure may indicate an organization of interview segments organized according to the metadata (e.g., tags or labels) submitted by multiple users. For instance, organizing the interview segments according to metadata may include grouping or categorizing the interview segments by the user-submitted tags. In one embodiment, grouping or categorizing the interview segments may include organizing the interview segments by tag popularity. In some embodiments, the community defined presentation structures may be created according to specific user characteristics such as beginner, intermediate, advanced, zip code, state, marital status, sex, or age. For example, presentation configuration system 100 may create a community defined presentation structure for residents of a particular state. Thus, to create the presentation structure for the particular state (e.g., California), the presentation configuration system may only utilize metadata from users of the specific state.

Selection and Implementation of Presentation Structures

When a user prepares a tax return with a tax preparation application, such as the various tax preparation applications of FIG. 1, the tax preparation application may provide the user with multiple presentation structure options. For example, in one embodiment, a user may choose to prepare a tax return by using the default presentation structure of the tax preparation application or an alternate presentation structure (e.g., a community defined presentation structure). The user may select to use a community defined presentation structure created by presentation configuration system 100.

A user may decide to use different presentation structure than the default presentation structure for various reasons. For example, the user may desire a more user friendly taxonomy or presentation structure that avoids the use of advanced tax or accounting terms. In general, the user may choose to utilize any presentation structure available to the tax preparation application (e.g., user created or community defined presentation structures). Since multiple presentation structure options may exist, the tax preparation application (e.g., tax preparation application 111 or remote tax preparation application 131), may include a display that enables the user to select a specific community defined presentation structures (e.g., a presentation structure provided by presentation configuration system 100) among available presentation structures. The display may include dropdown menus, text entry boxes, dialog boxes, buttons, controls or any other mechanism that may enable a user to select a specific presentation structure among multiple presentation structures. If a user chooses to use a community defined presentation structure that is not currently available through the tax preparation application, the tax preparation application may access the community defined presentation structure from a remote source such as presentation configuration system 100. Subsequently, the tax preparation application may present the interview segments to the user according to the presentation structure accessed from presentation configuration system 100.

Figure 2:
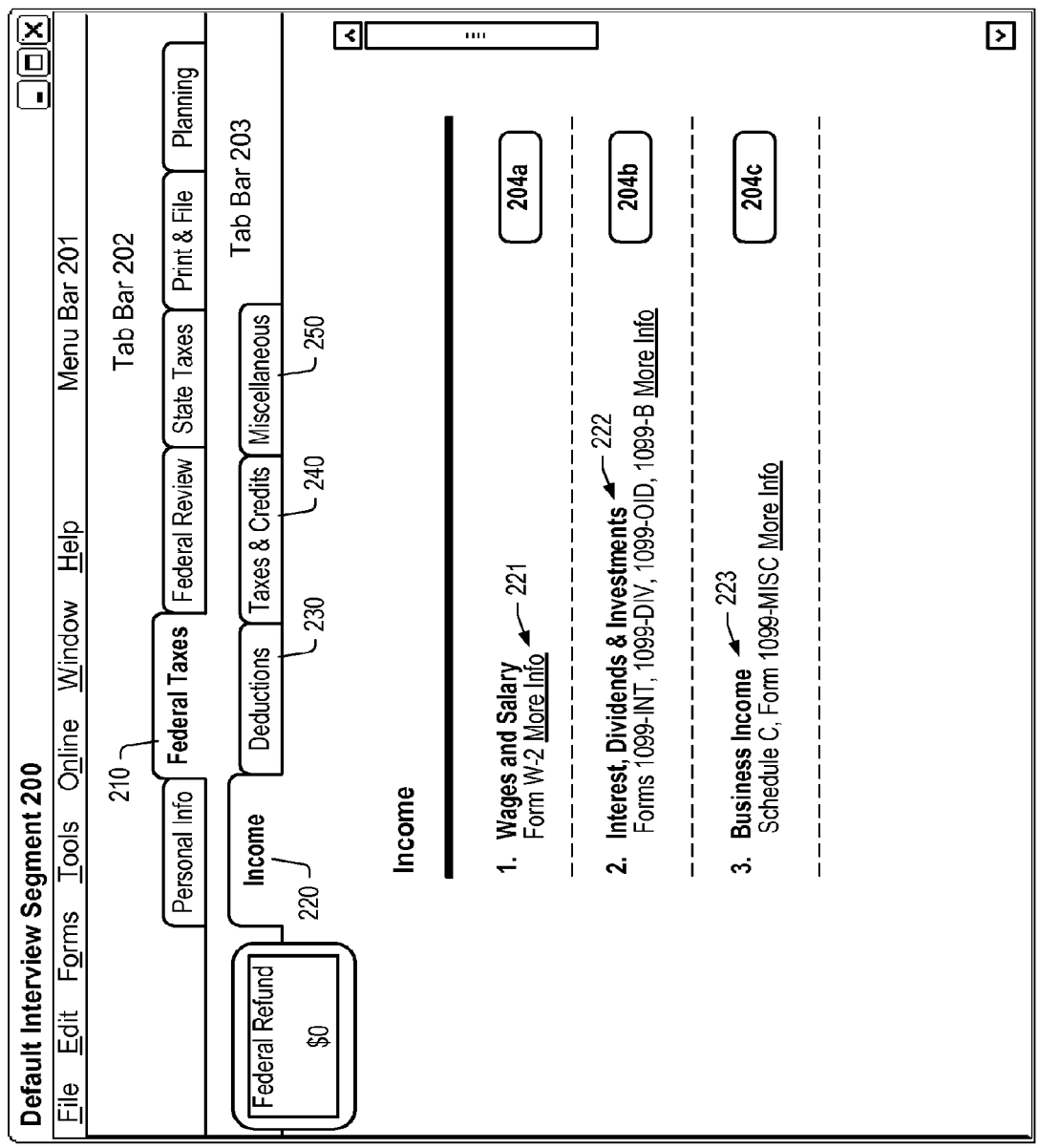
FIG. 2 illustrates one example of a default tax preparation application interview segment according to one embodiment.

FIG. 2 illustrates one example of a default tax preparation application interview segment according to one embodiment. While the interview segment of FIG. 2 illustrates a particular tax preparation application interview segment, it is not intended to limit the scope to any one particular interview segment.

As described above, a tax preparation application may include multiple interview segments, such as default interview segment 200. The tax preparation application may present the multiple interview segments to a user (e.g., a tax payer) according to a presentation structure (e.g., a default presentation structure) that defines the manner in which interview segments of a tax preparation application are presented to a user.

Default interview segment 200 may include one or more of, but is not limited to, a menu bar 201 and tab bars 202 and 203. Menu bar 201 may provide one or more menus for accessing various functionalities of tax preparation applications (e.g., tax preparation application 111) via user-selectable interface items (menu selections). Tab bars 202 and 203 may provide one or more tabs for switching between various interview segments presented to the user. Default interview segment 200 may include default labels such as the "income" label of tab 220. Additional tabs, such as tabs 230, 240 and 250, including the respective labels "deductions," "credits," and "miscellaneous," may enable a user to navigate to additional interview segments, such as if the user selects one of the tabs.

Additionally, the user may navigate to "child" interview segments associated with the current interview segment by selecting buttons (or controls) such as buttons 204 corresponding to interview segments options 221, 222 and 223. In some embodiments, tab bars 202 and 203 in addition to interview segments options such as options 221, 222 and 223 may be organized in a tree structure. For example, the "Federal Taxes" tab 210 may be a "parent node" having "child nodes" 220, 230, 240 and 250 corresponding to "income," "deductions," "taxes and credits," and "miscellaneous," respectively. Similarly, Income 220 may be a parent node to the interview segments corresponding to interview segment options 221-223. Organizing the interview segments in a tree structure may provide a logical flow for the user to utilize while completing the interview segments of the tax preparation application.

In some cases, the user may not be satisfied with the default presentation structure and default interview segments, such as default interview segment 200. For example, the user may feel that the taxonomy of the default presentation structure is too complicated or that the labels included within the interview segment are not user-friendly or easy to understand (e.g., the default labels may include tax or accounting terms). The interview segment may enable a user to submit custom tags or labels such that the default labels are replaced with new labels (e.g., more user-friendly labels) defined by the user.

Figure 3:
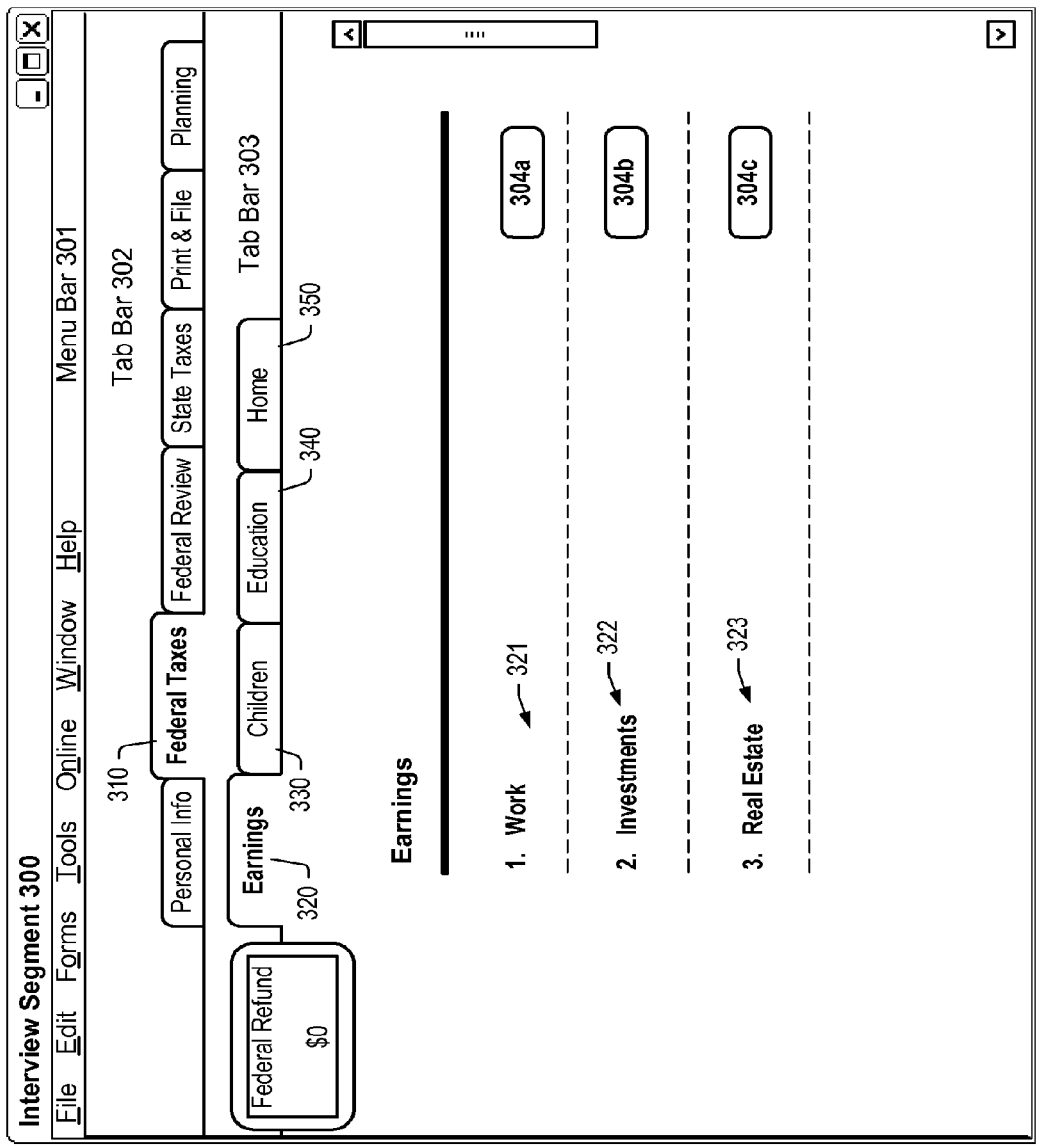
FIG. 3 illustrates one example of a customized tax preparation application interview segment according to one embodiment.

While the actual mechanisms for submitting the labels and/or tags are described in further detail below (e.g., in the description of FIG. 10), FIG. 3 illustrates one example of how a user customized interview segment may look after a user has submitted alternate tags or labels that are different than those of the default presentation structure. FIG. 3 is presented as one example of many possible customized interview segment and is not intended to limit the scope to any particular interview segment. The menu bar 301, tab bars 302 and 303, and buttons or controls 304 may operate in a manner similar to those corresponding elements of FIG. 2.

Interview segment 300 illustrates alternate labels, different than the default labels of the default presentation structure, which may be more user-friendly. As illustrated by tabs 320, 330, 340 and 350, which correspond to tabs 220-250 respectively, the interview segment may include alternate labels for the navigation tabs such as "earnings," "children," "education," and "home." Also, as shown by options 321-323, the "child nodes" of tab 320 may also be customized by the user through alternate labels. In this case, the user may have decided that the labels "work," "investments," and "real estate" more appropriately describe the interview segment options 321-323. Through the use of alternate labels, the user may create an alternate presentation structure that is more user-friendly than the default presentation structure.

Figure 4:
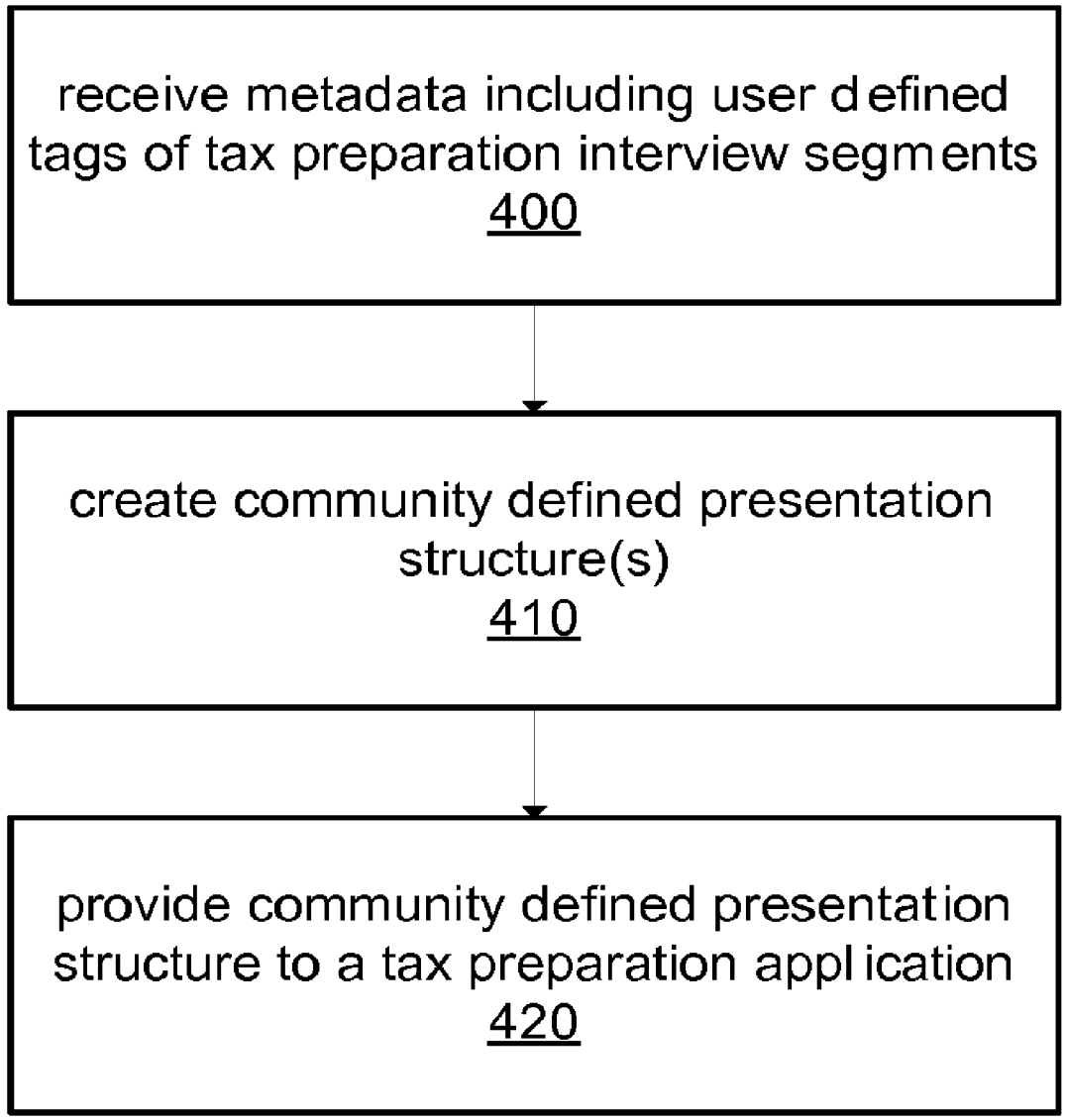
FIG. 4 is a flowchart illustrating a method for creating and providing presentation structures according to one embodiment.

FIG. 4 is a flowchart illustrating a method for creating and providing presentation structures according to one embodiment. The method may be performed by presentation configuration system 100, for example. Block 400 illustrates receiving metadata including user defined tags of interview segments. Typically, the metadata received may correspond to one of multiple users using tax preparation applications to prepare tax returns. For example, as a user is completing interview segments of a tax preparation application, the user may submit metadata (e.g., tags or labels) associated with one or more of the interview segments. The tax preparation application may transmit the metadata submitted by the user to presentation configuration system 100. Receiving the metadata may include receiving metadata from one user as well as receiving metadata from multiple users. In some embodiments, receiving the metadata may include simultaneously receiving multiple sets of metadata from multiple users via tax preparation applications.

In some embodiments, receiving the metadata may include receiving a data packet that corresponds to an interview segment. For example, the data packet may include a unique identifier for an interview segment (e.g., an identifier that differentiates the interview segment among other interview segments), one or more user defined tags or labels associated with the interview segment, and other identifying information of the interview segment such as what tax preparation application the interview segment belongs to (e.g., name and version number of the application). Receiving the metadata may further include storing the user defined tags or labels according to respective interview segments. In other embodiments, receiving the metadata may include receiving a data packet that includes multiple metadata associated with multiple unique interview segment identifiers.

In one embodiment, receiving the metadata may include receiving data posted by a tax preparation application. For example, presentation configuration system 100 may include a data server in which data may be posted. For instance, a tax preparation application may collect metadata from a user and send the metadata (e.g., via a post command or FTP transfer) to the data server. In other embodiments, receiving the metadata may include querying multiple tax preparation applications and receiving a response from the applications including metadata (e.g., tags or labels corresponding to interview segments). For example, presentation configuration system 100 may establish data connections with tax preparation applications that are being utilized to prepare tax returns. Thus, the presentation configuration system may have knowledge of the tax preparation applications that have an active connection and may query one or more of those tax preparation applications for metadata that has been submitted by a user.

Block 410 illustrates creating the community defined presentation structure from the metadata. In general, a community defined presentation structure may be any presentation structure for a tax preparation application that is created from user submitted metadata of interview segments. In one embodiment, creating a community defined presentation structure may include creating a presentation structure in which interview segments are organized by tag popularity. Since presentation configuration system 100 may receive multiple metadata from different users for a given interview segment, presentation configuration system 100 may determine a ranking of the metadata (e.g., tags or labels) based on various characteristics (e.g., popularity) for each interview segment. For instance, for each of a set of interview segments of a tax preparation application, presentation configuration system 100 may determine a ranking of popular metadata for each interview segment. For example, the presentation configuration may determine a ranking of most popular metadata based on all metadata submitted or based on a particular characteristic (e.g., popularity among users of a specific location). Thus, the presentation configuration system may create a presentation structure that organizes the interview segments according to various levels of popularity.

In one embodiment, the created presentation structure may have alternate tags and labels for tax topics while maintaining the same organization of a default presentation structure. In other words, the organization of interview segments may remain the same while the taxonomy used to describe the interview segments may be created from user metadata. For example, if an interview segment is categorized under the tax topic "income" in a default presentation structure, it may be categorized under a metadata alternative of income such as "money" or "earnings" in the community defined presentation structure.

To complete a tax preparation application (e.g., to create a tax return), the user may need to submit a minimum set of data or information corresponding to a minimum set of interview segments. In general, the community defined presentation structure may be created in any manner that retains the minimum set of interview segments necessary for the completion of a tax preparation application. In some cases, the minimum set of interview segments may contain one or more dependencies such that certain segments may need to be completed before or after other segments. In other cases, some interview segments may be removed from or added to the presentation structure depending on a user's responses to one or more of the interview segments included within the minimum set.

After a community defined presentation structure is created, it may be provided to a tax preparation application as illustrated by block 420. In one embodiment, a community defined presentation structure may be provided to a tax preparation application in response to a request for the presentation structure from the tax preparation application. For example, presentation configuration system 100 may transmit a community defined presentation structure over network 101 to a tax preparation application that sends a request for the specific community defined presentation structure.

In other embodiments, providing the community defined presentation structure to a tax preparation application may include providing multiple presentation structures to the tax preparation. For example, presentation configuration system 100 may present multiple community defined presentation structures to a tax preparation application. For instance, in some cases, a tax preparation application may request all current community defined presentation structure. In another embodiment, providing the presentation structure may include providing multiple community defined presentation structures (e.g., a set of presentation structures) to multiple tax preparation applications. For example, multiple tax preparation applications may subscribe to a community defined presentation structure feed (e.g., an XML feed). Thus, providing the presentation structures may include providing a feed of multiple community defined presentation structures. In some embodiments, providing the community defined presentation structure may include sending a list or ranking of the community defined presentation structures (e.g., to preserve bandwidth). The tax preparation application may select one or more community defined presentation structures and send a response indicating a selection. Thus, providing the community defined presentation structures to a tax preparation application may include receiving the response and transmitting the selected community defined presentation structures to the tax preparation application.

In yet another embodiment, providing the community defined presentation structure to a tax preparation application may include providing a database of community defined presentation structures that may be accessed by other entities. For example, presentation configuration system 100 may include a community defined presentation structure database that includes multiple community defined presentation structures. For instance, the database may provide presentation structures to tax preparation applications such as tax preparation application 111 or remote tax preparation application 131.

Figure 5:
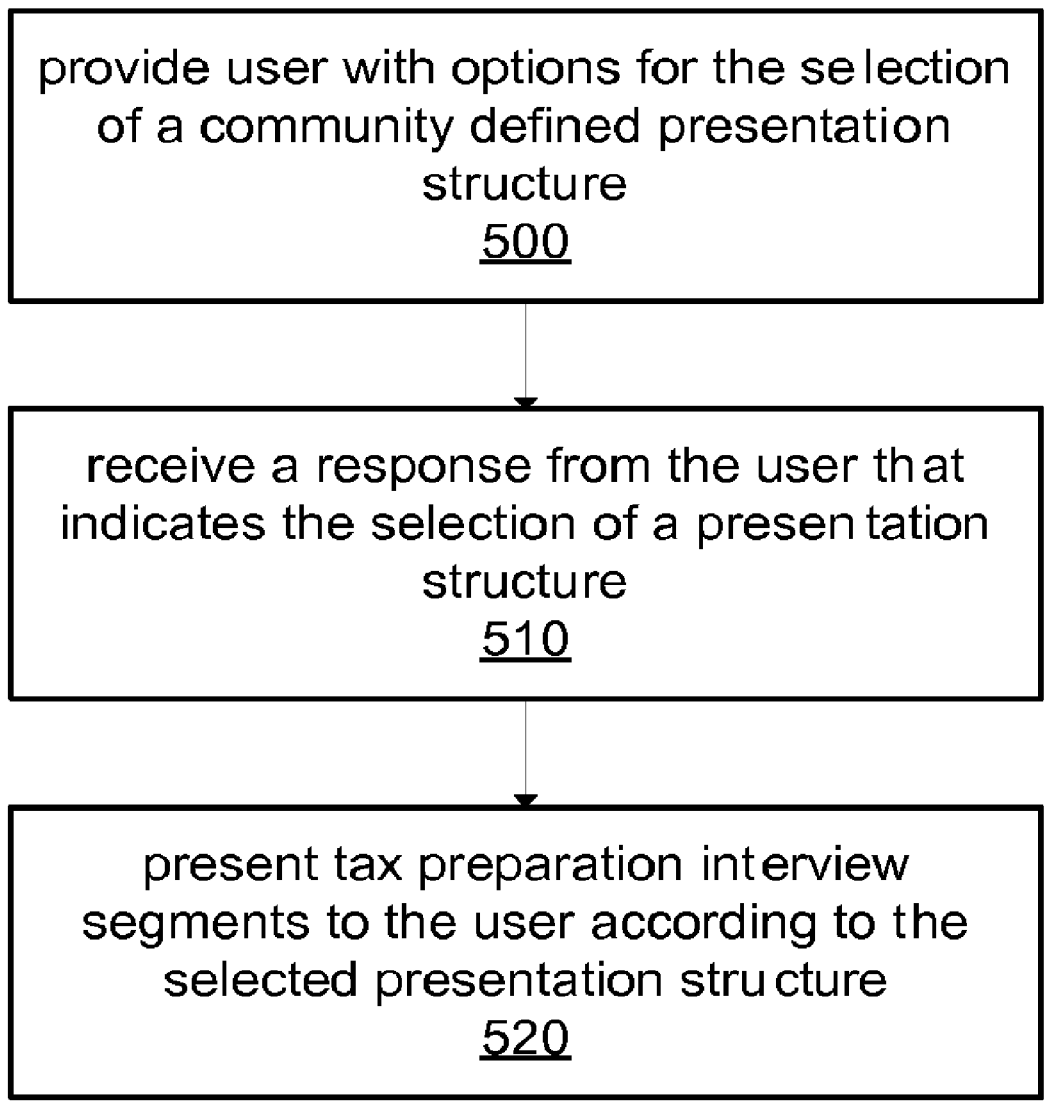
FIG. 5 is a flowchart illustrating a method for providing interview segments to a user according to a user selected presentation structure, according to one embodiment.

FIG. 5 is a flowchart illustrating a method for providing interview segments to a user according to a user selected presentation structure, according to one embodiment. The method may be performed by a tax preparation application, such as tax preparation application 111 or remote tax preparation application 131. In embodiments, a user that is using a tax preparation application may prefer to use a different presentation structure than the default presentation structure. In some cases, the default presentation structure may be difficult to understand for users unfamiliar with tax or accounting terms. In other cases, the user may simple prefer to try an alternate presentation structure. To enable a user to select a different presentation structure than the default presentation structure, the tax preparation application may enable the user to select from a plurality of options as illustrated by block 500. Block 500 illustrates providing a user with options for the selection of a community defined presentation structure. In one embodiment, providing the user with options for the selection of community defined presentation structures may include presenting a display to the user including dropdown menus or dialog boxes that enable the user to select one of multiple presentation structures. For example, tax preparation application 111 may include a display that includes an interface for selecting one of multiple options such as a dropdown menu, dialog box, controls, buttons, or any other display feature that may enable a user to select a community defined presentation structure. In one embodiment, the presentation structure options correspond to community defined presentation structures created according to a specific user characteristics such as beginner, intermediate, advanced, zip code, state, marital status, sex, or age or another characteristic of a user. One example of such a display is described below in regard to FIG. 11. In general, providing a user with community defined presentation structures may include any method of notifying the user of the presentation structures that are available for use with a tax preparation application.

As illustrated by block 510, after a user chooses a community defined presentation structure, the user's selection may be received (e.g., by a tax preparation application). For example, in one embodiment, tax preparation application 111 may receive a selection of a community defined presentation structure from a user (e.g., a user preparing a tax return). In some cases, such as when a user is utilizing a remote tax preparation application, the user's response may be received over a network, such as network 101. In general, the user's response may be any response that indicates one of the presentation structure options presented to the user.

Block 520 illustrates presenting the tax preparation interview segments to the user according the community defined presentation structure that the user selected. In some embodiments, presenting the tax preparation interview segments to the user according to the community defined presentation structure may include accessing the presentation structure from a presentation configuration system such as presentation configuration system 100. For example, tax preparation application 111 may access configuration system 100 over network 101. The tax preparation application may provide a request to the presentation configuration system for a specific community defined presentation structure. In response, the tax preparation application may receive the requested community defined presentation structure over a network such as network 101. Once the tax preparation application receives the presentation structure, the tax preparation application may present interview segments to the user according to the community defined presentation structure.

In some embodiments, presenting the interview segments to the user may include interpreting a data structure that represents a community defined presentation structure. For example, a sequential order in which the interview segments should be presented to a user may be extracted from the data structure. In further example, the data structure may include a mapping of the default presentation structure to the community defined presentation structure selected by the user. Thus, presenting the interview segments to the user may include presenting the interview segments according to the mapping of the data structure.

Figure 6:
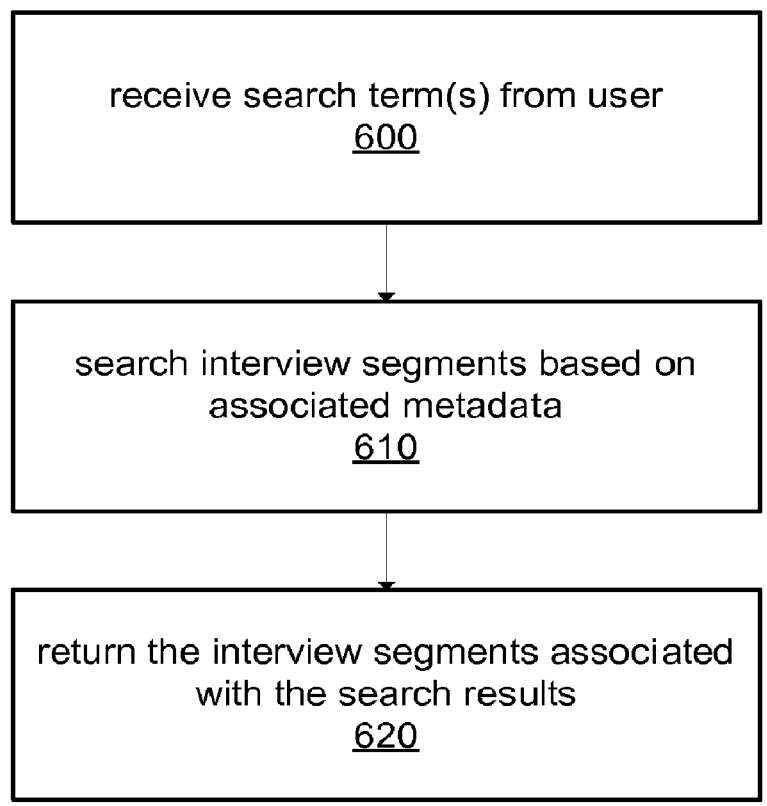
FIG. 6 is a flowchart illustrating a method of searching among interview segments of a tax preparation application according to one embodiment.

FIG. 6 is a flowchart illustrating a method of searching among interview segments of a tax preparation application according to one embodiment. The method may be performed by a tax preparation application, such as tax preparation application 111 or remote tax preparation application 131. Block 600 illustrates receiving a search term (e.g., a keyword) from a user. The user may provide a term related to a specific tax related topic such as donations, college expenses or capital gains. In one embodiment, receiving a search term from a user may include receiving the search term through a user interface or display. For example, tax preparation application 111 may include a display that enables a user to enter a search term or keyword. For instance, the display may include a text entry box in which the user may enter search terms or phrases. In other cases, the display may include dropdown menus, dialog boxes, buttons or controls so that the user may enter and submit one or more search terms.

Block 610 illustrates searching the interview segments based on associated user defined metadata. In other words, instead of searching for interview segments by content (e.g., text of the interview segment), the interview segments may be searched for based on the metadata that is associated with that interview segment. The interview segments may be searched for based on tags that are applied locally by the user such as tags or labels applied by the user but not transmitted to a presentation configuration system. Additionally, the interview segments may also be searched for based on community metadata (e.g., included with a community defined presentation structure) such as the metadata submitted by multiple users to the presentation configuration system. For example, tax preparation application 111 may search for the term or phrase among tags associated with the various interview segments of the tax preparation application. For instance, if the search phrase is "donating my car," there may not be an interview segment that contains the specific phrase. However, there may be user submitted tags that contain all or part of the phrase. Thus, searching the interview segments may include returning as results the interview segments that are associated with metadata matching the search term or phrase. In other embodiments, searching the interview segments may include a combination of searching among the content and metadata of the interview segments. Once the results are determined, the interview segments may be presented to the user as illustrated by block 620.

Figure 7:
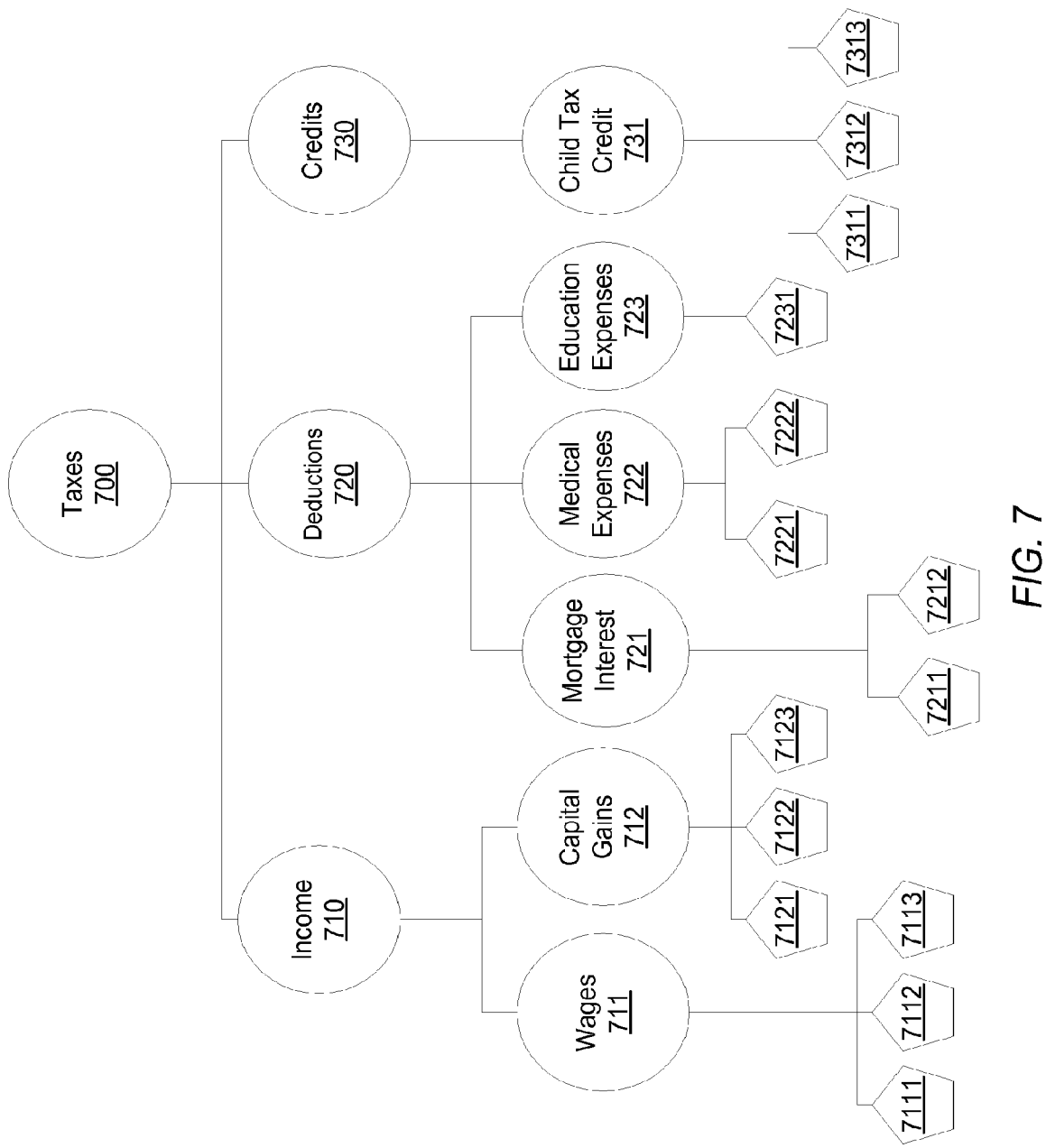
FIG. 7 illustrates a graphical representation of one example of a default presentation structure according to one embodiment.

FIG. 7 illustrates a graphical representation of one example of a default presentation structure according to one embodiment. The graphical representation of FIG. 7 may be a hierarchical tree structure including a root node and child nodes each representing tax topics. The nodes of FIG. 7 may be viewed as topics and subtopics. The root node 700 may be the general topic in which all subtopics exist. For example, the root node includes subtopic nodes (also child nodes) 710, 720 and 730 including Income, Deductions, and Credits respectively. Further, the tree structure may include multiple hierarchy levels such that the root node's child nodes are also parent nodes to nodes below them. For example, node 711 (Wages) and node 712 (Capital gains) are both child nodes to node 710 (Income). As illustrated by the lowest entities of the tree structure, the various pentagons of FIG. 7 may be graphical representations of interview segments. For example, interview segments 7111, 7112 and 7113 are interview segments associated with the subtopic "Wages." The other interview segments of FIG. 7 may be similarly associated with their respective parent nodes.

In one embodiment, a tax preparation application (e.g., tax preparation application 111) may present to a user the interview segments of FIG. 7 according to the default presentation structure. The tax preparation application may present the interview screens to the user according by subtopic. For example, the tax preparation application may present to a user the interview segments associated subtopic 710, followed by the interview segments of subtopic 712, and continuing until all of the interview segments have been presented to the user. While the tree structure of FIG. 7 is presented as a graphical representation, in embodiments, the default presentation structure may be a data structure such as a tree data structure or another data structure that may be interpreted by a tax preparation application.

Figure 8:
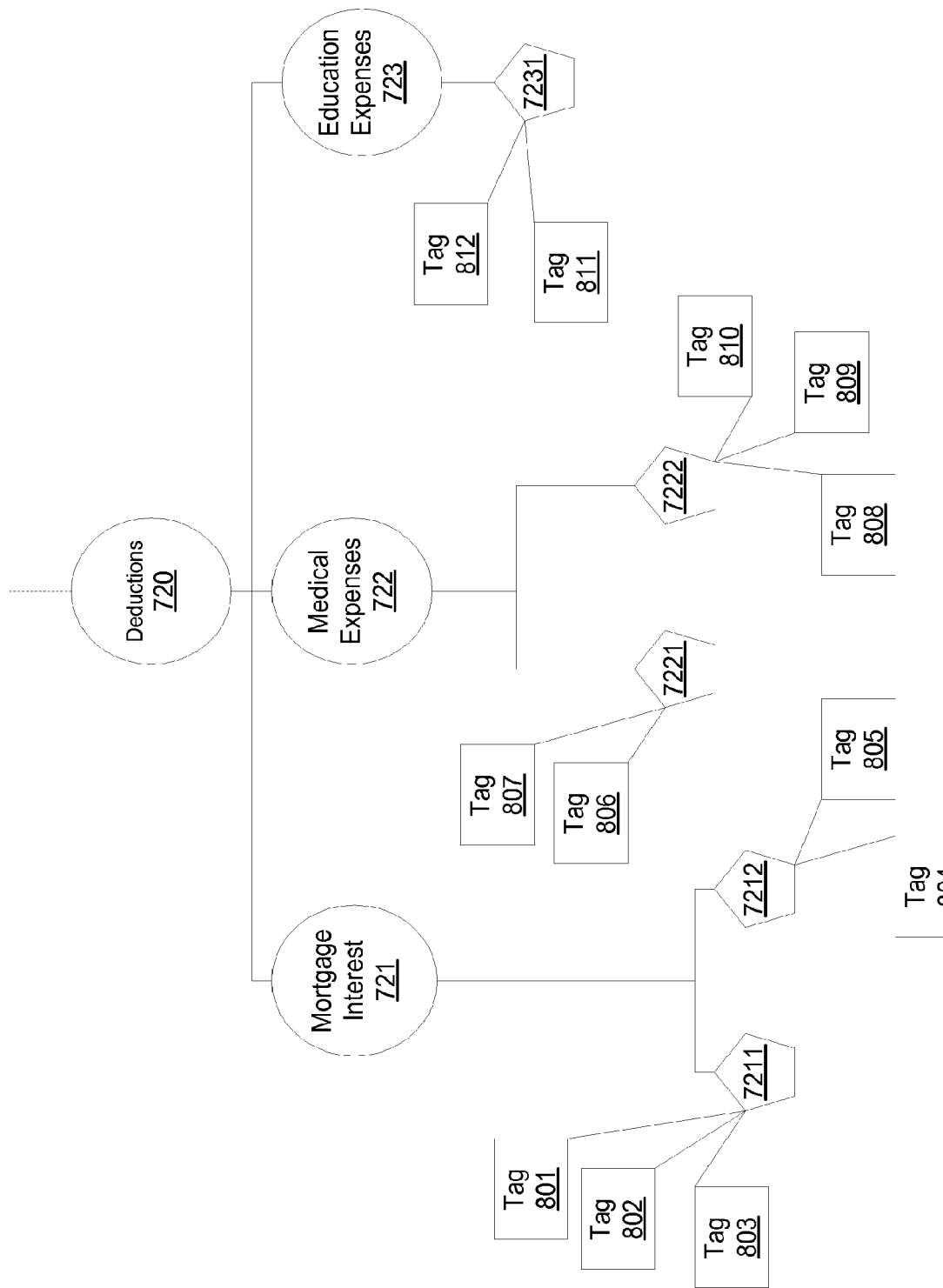
FIG. 8 illustrates a graphical representation of tagged interview segments according to one embodiment.

FIG. 8 illustrates a graphical representation of tagged interview segments according to one embodiment. Additionally, the graphical representation is a subtree from the tree structure of FIG. 7. Tags 801-812 may be metadata submitted by a user such as tags or labels for the various interview segments. The metadata tags may be metadata applied locally such as tags or labels applied by the user for personal use but not transmitted to a presentation configuration system. Additionally, the metadata tags may be community tags obtained from presentation configuration system 100. As illustrated by the metadata tags 801-812, each interview segment may be tagged with metadata (e.g., tags or labels). For example, if interview segment 7211 is associated with annual mortgage interest, metadata tags 801, 802 and 803 may include tags such as "house," "home," or "residence," for example. In general, the metadata tags of an interview segment may be any tag defined by a user for a specific interview segment. For example, among other things, the metadata tags 801-812 may be any of various user defined tags such as "home," "family," "health," and "education." Additionally, multiple tags may be placed on a single interview segment.

In one embodiment, a tax preparation application (e.g., tax preparation application 111) may receive the metadata tags, such as tags 801-812, from a user. For example, as a user uses tax preparation application 111, the user may be presented with a mechanism for submitting metadata tags such as a text entry field on each interview segment. After collection, the tax preparation application may transmit the tags to a presentation configuration system (e.g., presentation configuration system 100) and/or apply the tags locally to the tax preparation application that the user is using.

Figure 9:
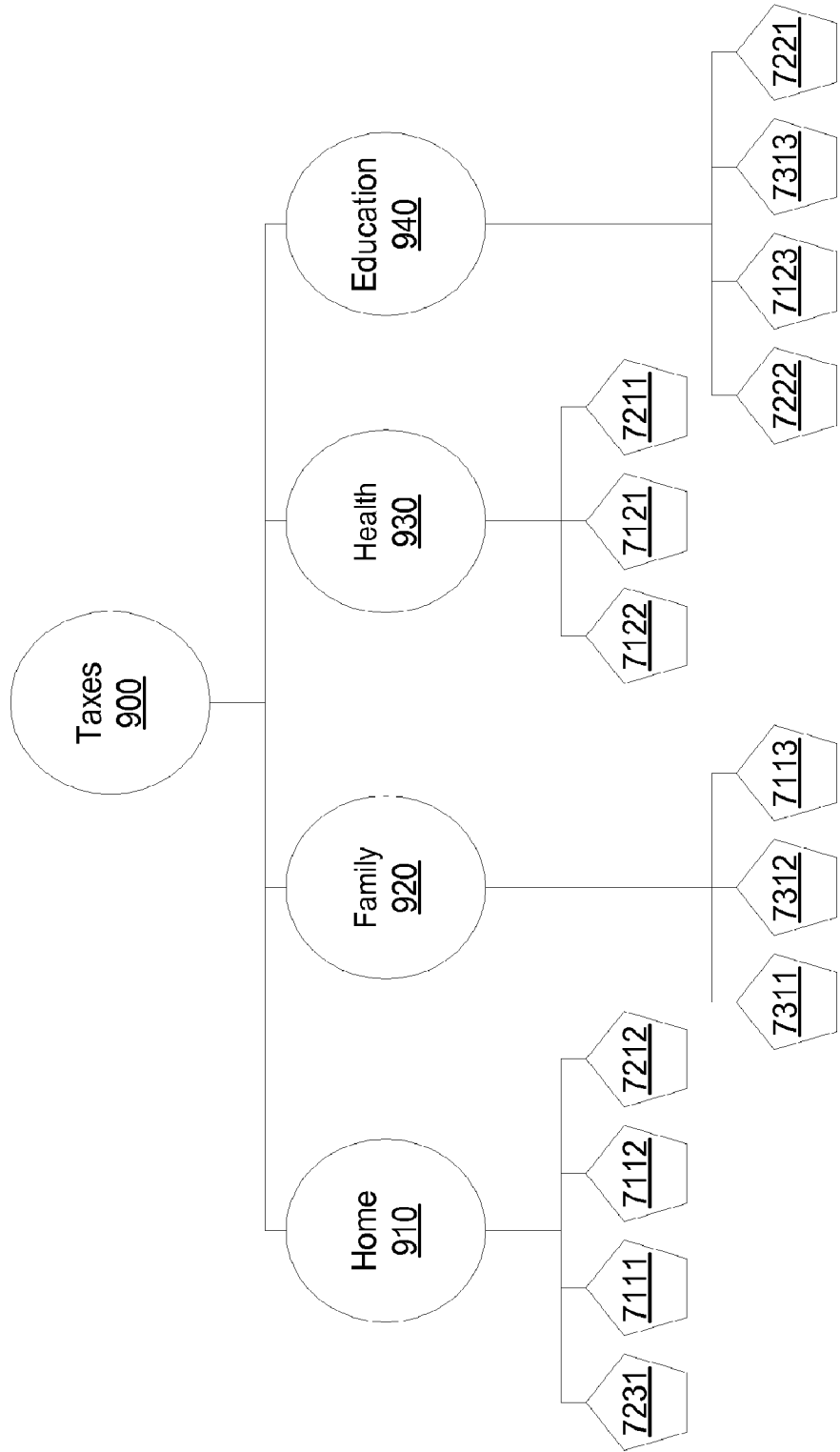
FIG. 9 illustrates a graphical representation of a community defined presentation structure according to one embodiment.

FIG. 9 illustrates a graphical representation of a community defined presentation structure according to one embodiment. In one embodiment, the graphical representation of a community defined presentation structure is created from another presentation structure (e.g., a default presentation structure). For example, the presentation structure of FIG. 9 may have been created from a presentation structure such as the presentation structure represented by FIG. 7. For instance, by collecting user defined metadata tags, such as those illustrated by FIG. 8, the default presentation structure may be reorganized (e.g., by a presentation configuration system). Thus, the tree structure of FIG. 9 may contain each interview segment from FIG. 7 organized in a different manner than the default configuration. For example, new child topics, such as child topics 910, 920, 930 and 940, may be created from user submitted metadata tags.

To complete a tax preparation application (e.g., to create a tax return), the user may need to submit a minimum set of data or information corresponding to a minimum set of interview segments. In general, the community defined presentation structure may be created in any manner that retains the minimum set of interview segments necessary for the completion of a tax preparation application. In some cases, the minimum set of interview segments may contain one or more dependencies such that certain segments may need to be completed before others. In other cases, some interview segments may be removed from or added to the presentation structure depending on a user's responses to one or more of the interview segments included within the minimum set.

Figure 10:
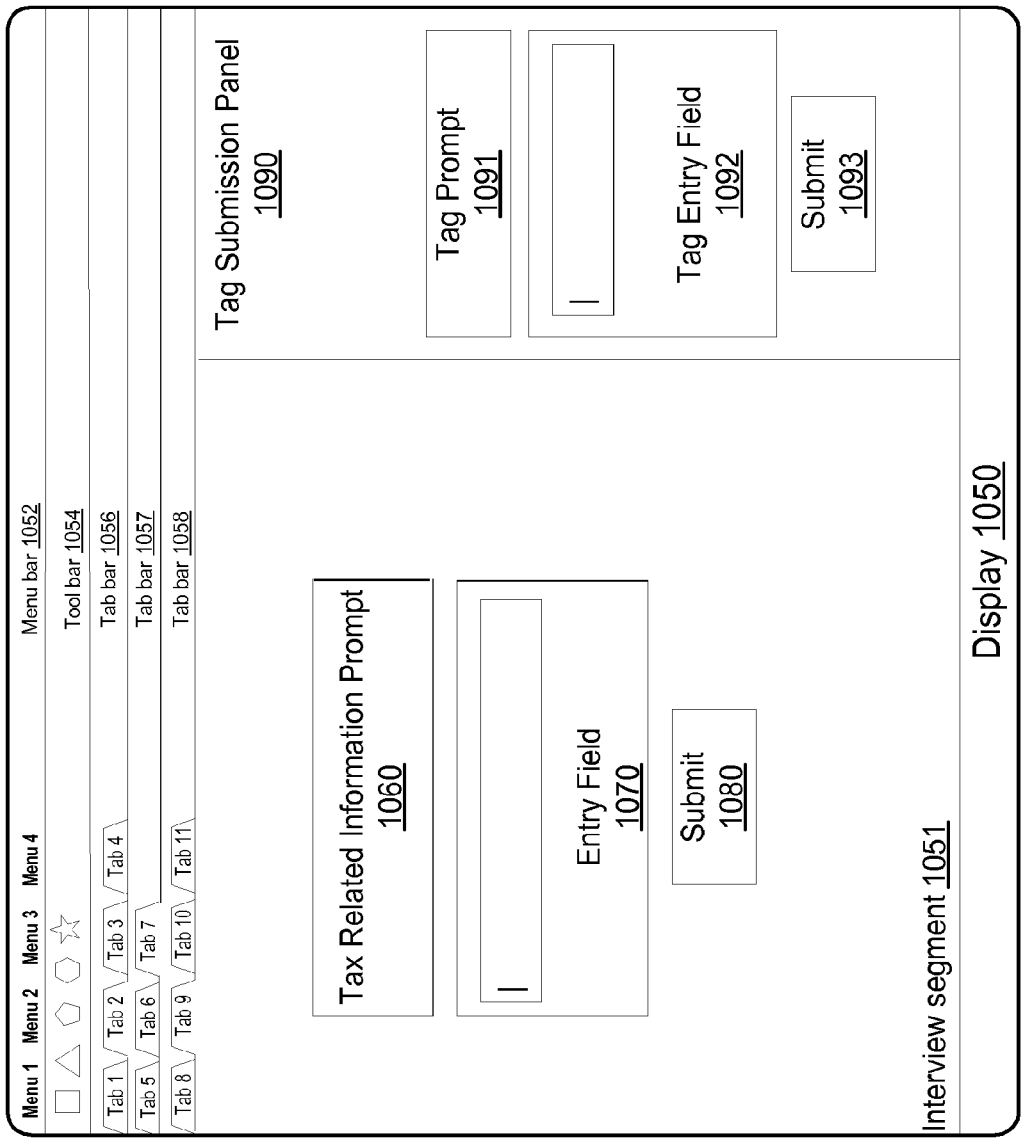
FIG. 10 illustrates a display of a tax preparation application including a tag submission mechanism according to one embodiment.

FIG. 10 illustrates a display of a tax preparation application including a tag submission mechanism according to one embodiment. In one embodiment, display 1050 may include one or more of, but is not limited to, a menu bar 1052, a tool bar 1054, and tab bars 1056, 1057 and 1058. Menu bar 1052 may provide one or more menus for accessing various functionalities of tax preparation applications (e.g., tax preparation application 111) via user-selectable interface items (menu selections). Tool bar 1054 may provide one or more tool icons for accessing various tools of tax program 100. Tab bars 1056, 1057 and 1058 may provide one or more tabs for switching between various interview segments (e.g., interview segment 1051) presented to the user of the display. In one embodiment, the tabs of the display may correspond to a default presentation structure. For example, the tabs of display may correspond to a data structure represented by the tree structure of FIG. 7. In other embodiments, the tabs of the display may correspond to a community defined presentation structure such as a data structure represented by the tree structure of FIG. 9.

In one embodiment, interview segment 1051 may include a tax related information prompt that prompts the user for information necessary to complete a tax return. For example, prompt 1060 may ask the user to enter information into entry field 1070 and submit the information by selecting submit option 1080. Entry field 1070 may be capable of accepting any data or information that is necessary for the completion of a tax return.

Display 1050 may also include a metadata submission panel, such as tag submission panel 1090, for the submission of metadata associated with interview segments. Tag submission panel 1090 may include a tag prompt, such as tag prompt 1091, that may prompt the user to submit metadata associated with the interview segment of the display. Tag entry field 1092 may enable a user to enter any metadata (e.g., tags or labels) that they user considers relevant to interview segment 1051. For example, if interview segment 1051 prompts a user to enter annual wages earned, a user may enter tags such as "job" or "money" into tag entry field 1092. Submit option 1093 submits the information entered into tag entry field 1092 to the tax preparation application. The information submitted through the tag entry field may be transmitted to a presentation configuration system and/or applied locally to the tax preparation application (e.g., in the form of alternate interview segment labels).

Figure 11:
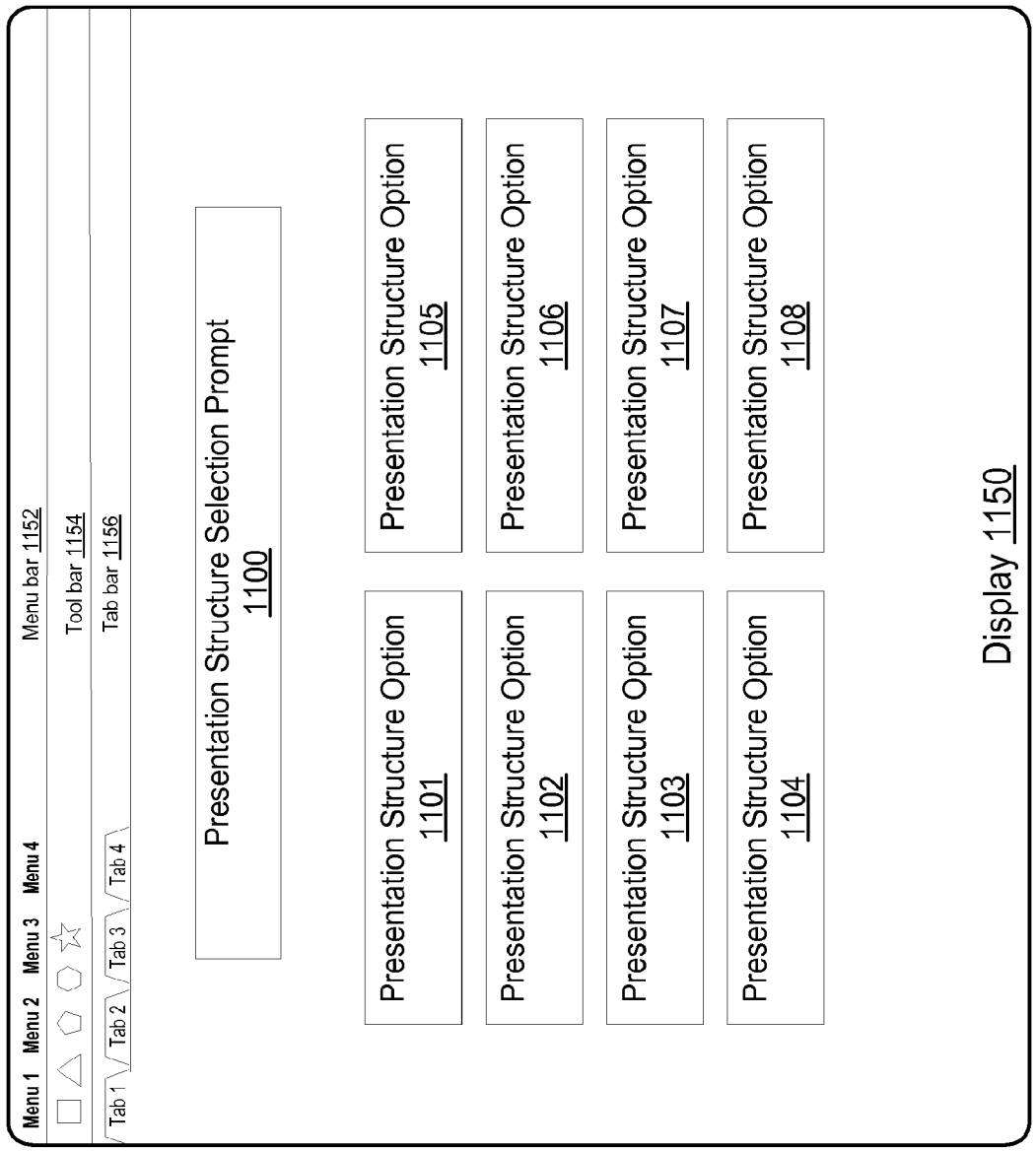
FIG. 11 illustrates a display of a tax preparation application including a tag submission mechanism according to one embodiment.

FIG. 11 illustrates a display of a tax preparation application including a tag selection mechanism according to one embodiment. In one embodiment, display 1150 may include one or more of, but is not limited to, a menu bar 1152, a tool bar 1154, and a tab bar 1156. Menu bar 1152 may provide one or more menus for accessing various functionalities of tax preparation applications (e.g., tax preparation application 111) via user-selectable interface items (menu selections). Tool bar 1054 may provide one or more tool icons for accessing various tools of tax program 100. Tab bar 1156 may provide one or more tabs for switching between various displays presented to the user of the preparation application.

Presentation structure selection prompt 1100 may prompt a user to select one of multiple presentation structure options such as presentation structure options 1101-1108. Presentation structure options 1101-1108 may each correspond to a community defined presentation structure, such as the community defined presentation structures available from a presentation configuration system (e.g., presentation configuration system 100). When the user selects a presentation structure option, display 1150 may notify the tax preparation application of the selection. Thus the tax preparation application may present interview segments of the tax preparation application to the user according to the user's selection. For example, if the user selects a "beginner" presentation structure, the display notify the tax preparation application that the user would like to have interview segments presented according to the "beginner" presentation structure.

Although the above methods described herein have been given in terms of a presentation configuration system and tax preparation applications, the description is not intended to limit the performing of the methods to a presentation configuration system and tax preparation applications.

Figure 12:
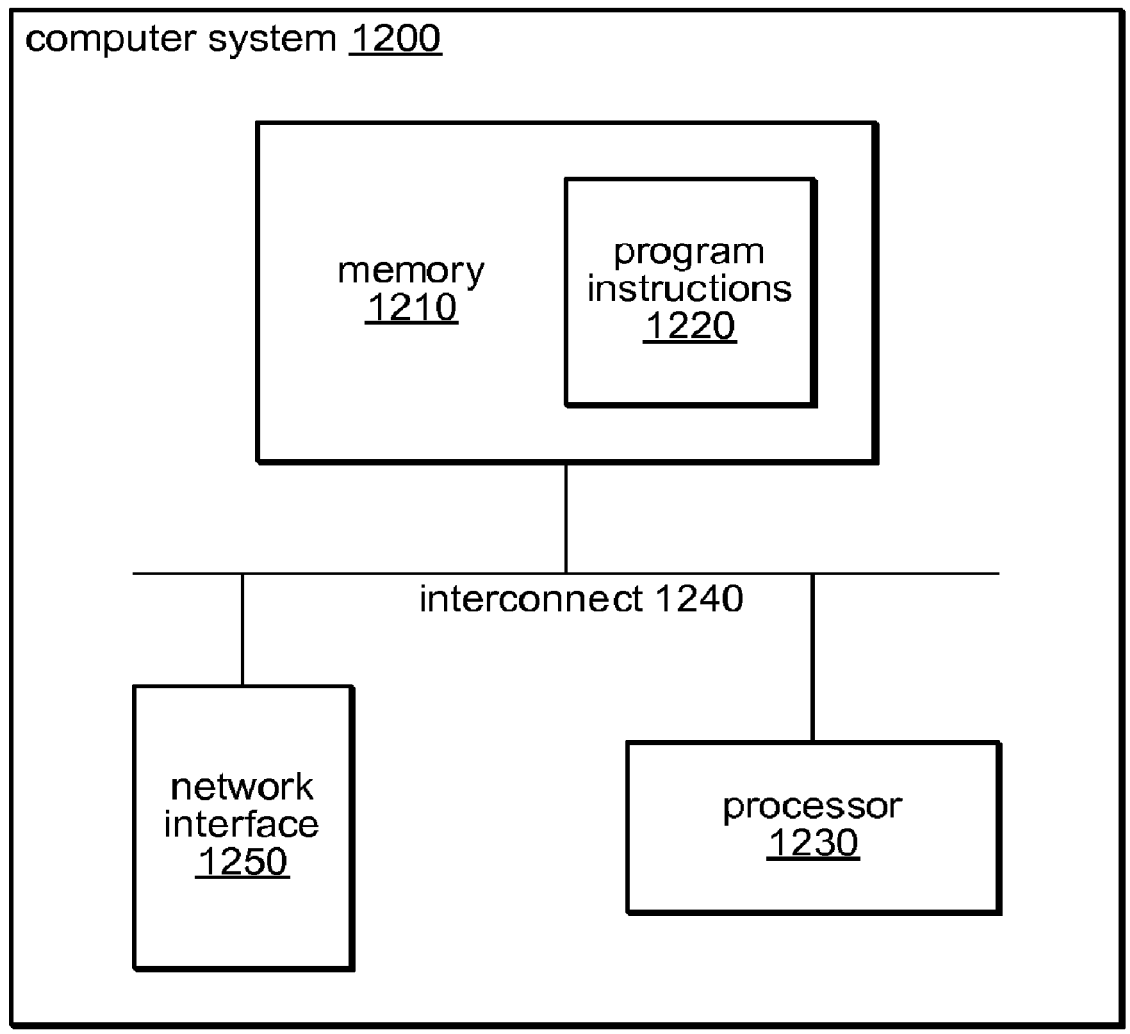
FIG. 12 illustrates a computing system capable of implementing a presentation configuration system and user computers according to one embodiment.

FIG. 12 illustrates a computing system capable of implementing a presentation configuration system and user computer such as presentation configuration system 100 and the various user computers of FIG. 1, as described herein and according to various embodiments. Computer system 1200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device. In various embodiments, computer system 1200 may represent user computer 110, described above.

The presentation configuration system and tax preparation applications described herein may be provided as a computer program product, or software, that may include a computer-readable storage medium having stored thereon instructions, which may be used to program a computer system (or other electronic devices) to implement a presentation configuration system or tax preparation application as described herein. A computer-readable storage medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1200 may include a processor unit 1230 (possibly including multiple processors, a single threaded processor, a multi-threaded processor, a multi-core processor, or other type of processor). The computer system 1200 may also include one or more system memories 1210 (e.g., one or more of cache, SRAM DRAM, RDRAM, EDO RAM, DDR RAM, SDRAM, Rambus RAM, EEPROM, or other memory type), an interconnect 1240 (e.g., a system bus, LDT, PCI, ISA, or other bus type), and a network interface 1250 (e.g., an ATM interface, an Ethernet interface, a Frame Relay interface, or other interface). The memory medium 1210 may include other types of memory as well, or combinations thereof. Embodiments of the presentation configuration system and tax preparation applications described herein may include fewer or additional components not illustrated in FIG. 12 (e.g., video cards, audio cards, storage devices, additional network interfaces, peripheral devices, or other components). The processor unit 1230, the network interface 1250, and the system memory 1210 may be coupled to the interconnect 1240. It should also be noted that one or more components of system 1200 might be located remotely and accessed via a network. One or more of the system memories 1210 may embody presentation configuration system 100 or the various tax preparation applications of FIG. 1.

Network interface 1240 may be configured to enable computer system 1200 to communicate with other computers, systems or machines, such as across network 100, described above. Network 100 may enable data communication between computer system 1200 and among other entities illustrated in FIG. 1, such as presentation configuration system 100 and the various user computers of FIG. 1, described above. Network interface 1240 may use standard communications technologies and/or protocols. Network 100 may include, and network interface 1240 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1240 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

In some embodiments, memory 1210 may include program instructions, such as program instructions 1220, configured to implement a presentation configuration system or tax preparation application, as described herein. Presentation configuration system 100 and tax preparation applications may be implemented in any of various programming languages or methods. For example, in one embodiment, presentation configuration system 100 and the various tax preparation applications of FIG. 1 may be JAVA based, while in another embodiments, it may be implemented using the C or C++ programming languages or other programming languages.

While the presentation configuration system and tax preparation applications have been described herein with reference to various embodiments, it will be understood that these embodiments are illustrative and that the scope of the presentation configuration system and tax preparation applications is not limited to them. Many variations, modifications, additions, and improvements are possible. More generally, the present presentation configuration system and tax preparation applications are described in the context of particular embodiments. For example, the blocks and logic units identified in the description are for ease of understanding and not meant to limit the presentation configuration system or tax preparation applications to any particular embodiment. Functionality may be separated or combined in blocks differently in various realizations or described with different terminology. Please also note that in reference to the methods illustrated by FIGS. 2-4, the various actions and functionality described herein regarding those respective methods may be performed in different orders and the respective method may be implement using a different number of actions than illustrated in FIGS. 2-4.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the presentation configuration system and tax preparation applications as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method for preparing tax returns using community defined presentation structures, comprising:

identifying, by a processor of a computer system, a default presentation structure comprising a first default financial category having a first financial interview segment (FIS) and a second default financial category having a second FIS and a third FIS;

displaying, during a plurality of sessions of a tax preparation application, the first FIS, the second FIS, and the third FIS to a first plurality of users according to a presentation order of the default presentation structure;

receiving, during the plurality of sessions, a plurality of tags assigned to the first FIS, the second FIS, and the third FIS by the first plurality of users, wherein the tax preparation application comprises a metadata submission panel having a graphical user interface (GUI) widget for inputting at least one of the plurality of tags;

identifying, by the processor a tag of the plurality of tags assigned to the first FIS and the third FIS; grouping, in response to identifying the tag, the first FIS of the first default financial category and the third FIS of the second default financial category into a first custom category, wherein the first custom category is user assigned based on the tag;

creating a community defined presentation structure based on multiple user assigned categories and comprising the first custom financial category and a second custom financial category having the second FIS;

displaying the first FIS, the second FIS, and the third FIS to a second plurality of users according to a presentation order of the community defined presentation structure;

receiving, from a user of the second plurality of users, a response to the first FIS; and populating a tax return for the user based on the response.

2. The method of claim 1, wherein the presentation order of the default presentation structure comprises displaying the third FIS after the second FIS, and wherein the presentation order of the community defined presentation structure comprises displaying the second FIS after the third FIS.

3. The method of claim 1, further comprising:
adding the community defined presentation structure to a plurality of presentation structures;
presenting the plurality of presentation structures to the second plurality of users before displaying the first FIS, the second FIS, and the third FIS to the plurality of second users; and
receiving, in response to presenting the plurality of presentation structures, a plurality of selections corresponding to the community defined presentation structures from the second plurality of users.

4. The method of claim 1, wherein identifying the tag comprises:
calculating a plurality of frequencies for a subset of the plurality of tags assigned to the first FIS and the third FIS; and
identifying a maximum frequency of the plurality of frequencies, wherein the tag corresponds to the maximum frequency.

5. The method of claim 1, further comprising:
receiving, during the plurality of sessions, a plurality of labels for the first FIS from the first plurality of users;
calculating a plurality of frequencies for the plurality of labels;
identifying a maximum frequency of the plurality of frequencies;
identifying a label of the plurality of labels corresponding to the maximum frequency; and
replacing text within the first FIS with the label before displaying the first FIS to the second plurality of users.

6. A system for preparing tax returns using community defined presentation structures, comprising:
a processor;
a memory operative connected to the processor; and
a plurality of software instructions stored in the memory and comprising functionality to:
identify a default presentation structure comprising a first default financial category having a first financial interview segment (FIS) and a second default financial category having a second FIS and a third FIS;
display, during a plurality of sessions of a tax preparation application, the first FIS, the second FIS, and the third FIS to a first plurality of users according to a presentation order of the default presentation structure;
receive, during the plurality of sessions, a plurality of tags assigned to the first FIS, the second FIS, and the third FIS by the first plurality of users, wherein the tax preparation application comprises a metadata submission panel having a graphical user interface (GUI) widget for inputting at least one of the plurality of tags;
identify a tag of the plurality of tags assigned to the first FIS and the third FIS;
group, in response to identifying the tag, the first FIS and the third FIS into a first custom category;
create a community defined presentation structure comprising the first custom financial category and a second custom financial category having the second FIS;
display the first FIS, the second FIS, and the third FIS to a second plurality of users according to a presentation order of the community defined presentation structure;
receive, from a user of the second plurality of users, a response to the first FIS; and
populate a tax return for the user based on the response.

7. The system of claim 6, wherein the presentation order of the default presentation structure comprises displaying the third FIS after the second FIS, and wherein the presentation order of the community defined presentation structure comprises displaying the second FIS after the third FIS.

8. The system of claim 6, the plurality of software instructions further comprising functionality to:
add the community defined presentation structure to a plurality of presentation structures;
present the plurality of presentation structures to the second plurality of users before displaying the first FIS, the second FIS, and the third FIS to the plurality of second users; and
receive, in response to presenting the plurality of presentation structures, a plurality of selections corresponding to the community defined presentation structures from the second plurality of users.

9. The system of claim 6, wherein the plurality of software instructions to identify the tag further comprise functionality to:
calculate a plurality of frequencies for a subset of the plurality of tags assigned to the first FIS and the third FIS; and
identify a maximum frequency of the plurality of frequencies, wherein the tag corresponds to the maximum frequency.

10. The system of claim 6, the plurality of software instructions further comprising functionality to:
receive, during the plurality of sessions, a plurality of labels for the first FIS from the first plurality of users;
calculate a plurality of frequencies for the plurality of labels;
identify a maximum frequency of the plurality of frequencies;
identify a label of the plurality of labels corresponding to the maximum frequency; and
replace text within the first FIS with the label before displaying the first FIS to the second plurality of users.

11. A non-transitory computer readable storage medium storing instructions for preparing tax returns using community defined presentation structures, the plurality of instructions comprising functionality to: identify a default presentation structure comprising a first default financial category having a first financial interview segment (FIS) and a second default financial category having a second FIS and a third FIS;
display, during a plurality of sessions of a tax preparation application, the first FIS, the second FIS, and the third FIS to a first plurality of users according to a presentation order of the default presentation structure;
receive, during the plurality of sessions, a plurality of tags assigned to the first FIS, the second FIS, and the third FIS by the first plurality of users, wherein the tax preparation application comprises a metadata submission panel having a graphical user interface (GUI) widget for inputting at least one of the plurality of tags;
identify a tag of the plurality of tags assigned to the first FIS and the third FIS;
group, in response to identifying the tag, the first FIS and the third FIS into a first custom category;

create a community defined presentation structure comprising the first custom financial category and a second custom financial category having the second FIS;

display the first FIS, the second FIS, and the third FIS to a second plurality of users according to a presentation order of the community defined presentation structure;

receive, from a user of the second plurality of users, a response to the first FIS; and populate a tax return for the user based on the response.

12. The computer readable storage medium of claim 11, wherein the presentation order of the default presentation structure comprises displaying the third FIS after the second FIS, and wherein the presentation order of the community defined presentation structure comprises displaying the second FIS after the third FIS.

13. The computer readable storage medium of claim 11, the instructions further comprising functionality to:

add the community defined presentation structure to a plurality of presentation structures;

present the plurality of presentation structures to the second plurality of users before displaying the first FIS, the second FIS, and the third FIS to the plurality of second users; and receive, in response to presenting the plurality of presentation structures, a plurality of selections corresponding to the community defined presentation structures from the second plurality of users.

14. The computer readable storage medium of claim 11, wherein the instructions to identify the tag further comprise functionality to:

calculate a plurality of frequencies for a subset of the plurality of tags assigned to the first FIS and the third FIS; and identify a maximum frequency of the plurality of frequencies, wherein the tag corresponds to the maximum frequency.

15. The computer readable storage medium of claim 11, the instructions further comprising functionality to:

receive, during the plurality of sessions, a plurality of labels for the first FIS from the first plurality of users;

calculate a plurality of frequencies for the plurality of labels;

identify a maximum frequency of the plurality of frequencies;

identify a label of the plurality of labels corresponding to the maximum frequency; and replace text within the first FIS with the label before the first FIS is displayed to the second plurality of users.

\* \* \* \* \*